United States Patent
Mushovic

(10) Patent No.: US 6,709,717 B2
(45) Date of Patent: Mar. 23, 2004

(54) METHOD FOR MAKING POLYMER SURFACED COMPOSITES

(75) Inventor: John N. Mushovic, Hanover, PA (US)

(73) Assignee: Margrace Enterprises, Inc., Hanover, PA (US)

(*) Notice: Subject to any disclaimer, the term of this patent is extended or adjusted under 35 U.S.C. 154(b) by 6 days.

(21) Appl. No.: 10/097,845

(22) Filed: Mar. 15, 2002

(65) Prior Publication Data

US 2002/0098362 A1 Jul. 25, 2002

Related U.S. Application Data

(63) Continuation-in-part of application No. 09/328,494, filed on Jun. 9, 1999, now Pat. No. 6,387,504.
(60) Provisional application No. 60/088,702, filed on Jun. 9, 1998.

(51) Int. Cl.[7] .................................................. C08F 2/38
(52) U.S. Cl. ...................... 427/518; 427/327.2; 428/48; 428/500; 264/239; 264/DIG. 31; 524/529; 524/599; 524/499; 523/220
(58) Field of Search .............................. 427/372.2, 518; 428/48, 500; 264/239, DIG. 31; 524/529, 599, 499; 523/220

(56) References Cited

U.S. PATENT DOCUMENTS

| | | | |
|---|---|---|---|
| 3,177,902 A | | 4/1965 | Rubenstein |
| 3,714,113 A | * | 1/1973 | Kingston |
| 4,269,869 A | | 5/1981 | Morohashi et al. |
| 5,658,624 A | | 8/1997 | Anderson et al. |
| 6,005,043 A | | 12/1999 | Zhu |
| 6,054,502 A | | 4/2000 | Friedlander et al. |

FOREIGN PATENT DOCUMENTS

DE  3938149 A1  5/1991

* cited by examiner

Primary Examiner—Kuo-Liang Peng
(74) Attorney, Agent, or Firm—Robert A. Cahill

(57) ABSTRACT

To produce a composite building unit having a polymer-cladded surface, a polymerizable resin binder and a blend of filler particles are combined to provide a resin binder/filler mixture which is deposited in a mold. A concrete substrate is then positioned in the mold with a face surface contacting a transition layer comprising a lightly filled resin binder/filler layer portion of the deposited mixture overlying a highly filled resin binder/filler layer portion of the deposited mixture. The resin binder in the transition layer migrates into pockets and pores in the substrate face surface to create mechanical locks when the resin binder is cured. These locks, in addition to chemical bonding, serve to permanently affix the cured resin binder as a surface cladding to the substrate. Initiators may be added to the resin binder to promote thermal and/or UV radiation cures thereof.

17 Claims, 3 Drawing Sheets

2 # METHOD FOR MAKING POLYMER SURFACED COMPOSITES

This application is a continuation-in-part application of application Ser. No. 09/328,494, filed Jun. 9, 1999, now U.S. Pat. No. 6,387,504, which application claims priority based on Provisional Application No. 60/088,702, filed Jun. 9, 1998.

FIELD OF INVENTION

The present invention relates to composites useful in building structures, such as floor tiles, pavers, blocks, flagstones, concrete bricks, and other architectural products, etc., and methods of making the same.

BACKGROUND OF THE INVENTION

Most existing processes to polymer coat or glaze Portland cement-based structures use cured Portland cement-based (concrete) structures as inserts or finished components. In other words, prior to polymer coating, glazing or painting masonry on concrete surfaces, concrete structures are in advanced stage of cure, i.e., well aged or heat processed to the point where they are easily handled.

The conventional method of glazing concrete structures is to apply a highly filled polyester or epoxy material on a surface of the structure that is procured by dry casting or extruding a cementitious-based material. In this process, the water to cement ratio (w/c) is minimized by tumbling the aggregates with closely controlled amounts of water and applying pressure to consolidate the damp, vibrated mix even further. These dry cast blocks are often glazed with a thermoset polymer after approximately 24 hours of initial consolidation. Other processes for decorating cured concrete areas include painting with moisture-cured, solvent-based, or air-cured materials, spraying freshly mixed two component systems normally followed by a post cure and "broadcast" whereby freshly mixed unsaturated polyester or epoxy is rolled onto cured concrete floors followed by broadcasting colored sand or colored polymer-coated quartz into the polymer, letting it thermally cure and then sweeping away the excess mineral. Thus, the bonding between the coating and the concrete surface using these conventional processes is basically chemical in nature.

The composite of the present invention has a bond between a thick coating or glaze and a substrate, which is superior in strength to the conventional composites. This bond is not only chemical but is strongly mechanical in nature, consisting of numerous mechanisms, many of which are not available to the above decorative techniques. The present method provides a mechanism for forming a substantially thick transitional layer between a polymeric coating layer and a substrate layer which comprises three dimensional structures (herein alternatively referred to as locks or pockets) that act to mechanically hold the layers together, thereby forming a strong bond between the coating and the substrate which is both chemical and mechanical in nature.

SUMMARY OF THE INVENTION

In accordance with the present invention, polymer resin binder blends are combined with solid particle fillers to produce low cost, functional designs on substrates, such as floor tiles, pavers, blocks, and many other building products in limitless colors, styles, and textures for both indoor and outdoor use.

In accordance with one aspect of the present invention, a method is provided for producing a composite structure having a decorative cladding as a first layer affixed to a substrate as a second layer by an intervening transition layer. This method comprises preparing a mixture of a polymerizable resin binder solution and a solid particle filler as the first layer. Placing a cement-based substrate material as the second layer in interfacial relation with the first layer. Developing the transition layer consisting essentially of the binder solution at the interface of the first and second layers, such that binder solution can migrate into the substrate material to form transition layer pockets of binder solution in the substrate material. The binder solution in the first layer and the transition layer is then cured to produce a durable surface cladding mechanically locked and chemically bonded to the second layer.

In accordance with one embodiment of the invention, the binder solution-filler mixture (first layer) is poured into a mold and the substrate material (second layer) is in the form of a cement slurry which is poured over the first layer. The cement slurry is concurrently cured with the resin binder solution to achieve the composite.

According to another embodiment, the substrate material is in the form of a pre-cast concrete structure in tile, paver, block, brick or like form. In this case, the resin binder is preferably curable, both thermally and by exposure to ultraviolet radiation. According to a further embodiment of the invention, the transition layer is applied to a surface of the pre-cast substrate as a precursor step to the application of the first layer. The resin binder solution in the first layer is then exposed to UV radiation. However, due to the UV blocking property of at least some of the filler particles, only a partial UV cure can be achieved. Complete cure of the resin binder in the first layer and in the transition layer is achieved thermally over time.

The invention accordingly comprises a method for making composites that comprised various combinations of steps, all as described hereinafter, and the scope of the invention will be indicated in the claims.

BRIEF DESCRIPTION OF THE DRAWINGS

For a full understanding of the nature and aspects of the invention, reference may be had to the following Detailed Description taken in conjunction with the accompanying drawings in which.

DETAILED DESCRIPTION OF THE INVENTION

Figure 1:
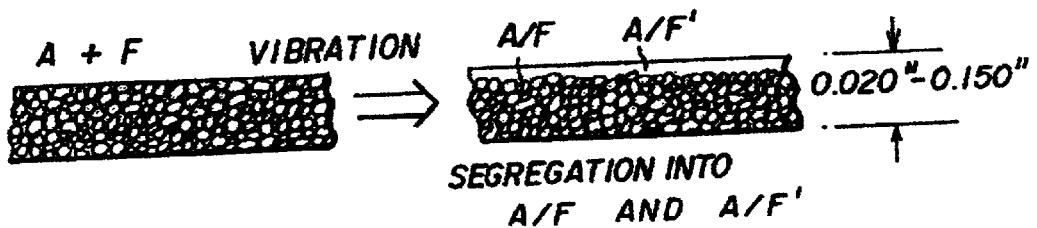
FIG. 1 is a cut-away view of an initial mixture of a polymerizable solution A and filler particles F that segregates into two distinct filled layers A/F, comprising A plus a majority of large filler particles and heavier fillers, and A/F', comprising A and small lines and low density fillers.
Figure 2:
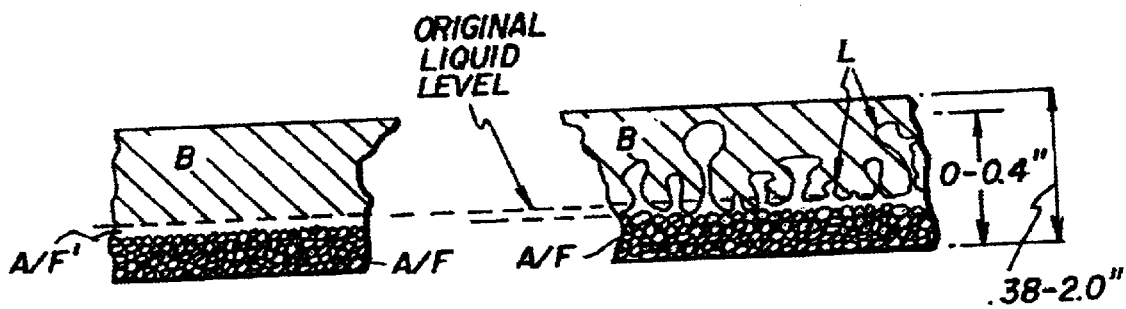
FIG. 2 is a cut-away view of the segregated mixtures of FIG. 1 upon addition of a slurry, paste, or liquid B, wherein pockets of the polymerizable solution A/F' formed by migration into substrate B are illustrated.
Figure 3:
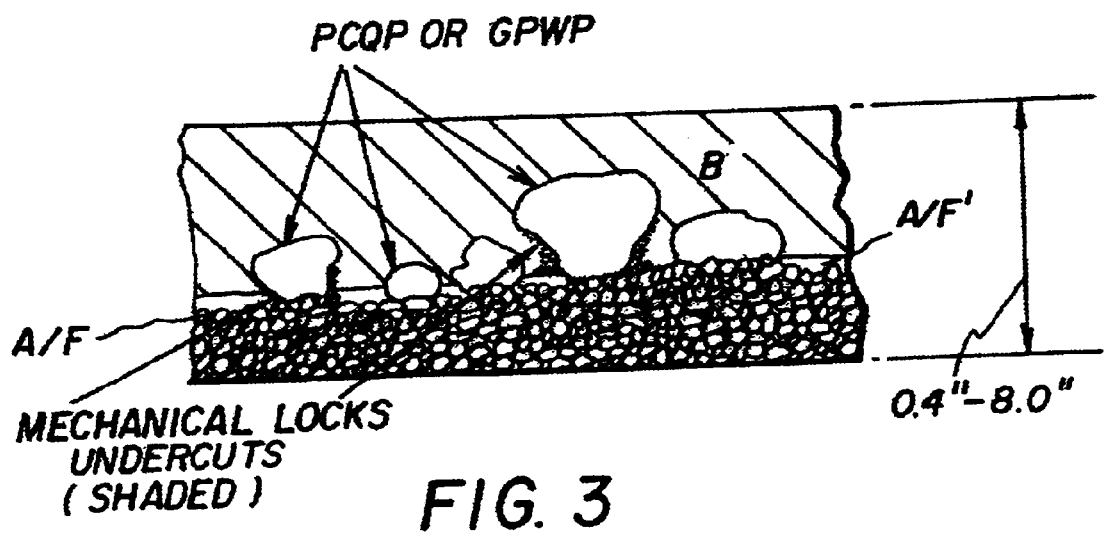
FIG. 3 is a cut-away view of a mechanical bonding mechanism between a substrate B and polymer-coated quartz particles PCQP or ground plastic waste particles GPWP or any of numerous other materials, polymers, or mineral solids that bond to A/F and contain undercuts that the substrate slurry B solidifies around.

Polymerizable resin binders useful in practicing embodiments of the present invention include families of polyurethanes, polyepoxides, epoxy-acrylates, urethane acrylates, methacrylates, unsaturated polyesters, polyols, acrylics and monomers and oligomers based on the backbone structures of these resins.

UV radiation curable resin binders are normally comprised of oligomers, monomers and photoinitiators. Whereas monomers are made up of a single molecule and polymers are made up of many molecules, oligomers are normally thought to contain fewer than ten or twelve molecules, for example. Also oligomers are normally thought to be associated with UV curable and biochemical chemicals or compounds. Normally pure acrylate and methacrylate oligomers possess high viscosities (15,000 centipoise or cps and higher). They are diluted with reactive monomers, either acrylates or methacrylates whose viscosities can be in the range of 20 cps (almost water-like), to form a mixture that is easier to process. There are literally hundreds of oligomers and reactive monomers all possessing unique characteristics, properties, and functionalities that are dependent upon their chemical structure. Thus, an oligomer, combinations of oligomers, combinations of oligomer(s) and monomer(s) that are compatible with each other offer a wide range of compositional possibilities for the resin binder A. Consequently, by tailoring the composition, it is possible to create a binder that, when polymerized, will demonstrate many selected properties and functions.

There are several companies whose products represent the majority of those found throughout the world. Sartomer Corporation produces literally hundreds of products for the coating industry. They manufacture and sell many monomers with functionalities that range from one to five that are based on approximately 100 different chemistries. They normally are acrylates or methacrylates. Their numbers are prefixed with SR, CD, M-Cure, and Saret or SR. BASF manufactures and sells about six of the most widely used acrylate, diacrylate, or triacrylate monomers under their Laromer brand, followed by the capitalized initials that represent the compound, e.g., Laromer DPGDA would represent dipropylene glycol diacrylate, a low viscosity monomer with a functionality of two based on dipropylene glycol. UCB Chemicals manufactures and sells approximately 30 monomers represented by either their initials UCB in capitals or under their Ebecryl trademark. One monomer of interest is beta-carboxyethyl acrylate where the functionality of the system is two—one acrylate site and one carboxylic acid site, that allows polymerization when exposed to free radicals. In general monomers are generally low viscosity reactive diluents that become part of the end system once polymerized. They also impart specific properties to the compounded blend, i.e., light stability, hardness, adhesive enhancement, processing ease, and so forth. Another basic property of the monomers is that they are compatible with the wide range of oligomers that are manufactured and sold by the above companies.

There are many differing chemically comprised oligomers. Each of these classes normally exhibits the properties associated with its specific backbone structure. Therefore, it would be expected that urethane acrylates could be formulated to produce urethane-like properties, ie., abrasion resistance, ductility, fair chemical resistance, and so forth. Likewise, there are polyurethanes, polyepoxides, unsaturated polyesters, acrylics, epoxy acrylates, aliphatic urethane acrylates, aromatic urethane acryates, polyester acrylates, specialty polyester acrylates, acrylic acrylates, methacrylates, numerous specialty acrylates other than polyester, and various additives that normally are used to enhance adhesion or release. These oligomers are produced by the above three companies under the CN, Sarbox or Sarcryl tradenames for Sartomer Corporation; the Ebecryl or EB designation for UCB Chemicals; and Laromer or LR for BASF's oligomers. Additionally, some of BASF's product line numbers are prefaced by PE (polyester), AU (aliphatic urethane), PO (polyether acrylates) and UP (unsaturated polyester). UCB Radcure also has a line of cycloaliphatic diepoxide resins tradenamed Uvacure. These resins are polymerized by exposure to UV light. A cationic catalyst (onium salt photoinitiator) is used which, in contrast to free radical photoinitiators, continues the polymerization process when the UV light is removed. These systems possess both UV cure and "dark" or thermal cure characteristics. These resins can be modified with other epoxide resins, free radical photoinitiated epoxy acrylate systems, polyol modifiers or vinyl ethers to produce coatings with a wide range of properties and processing possibilities.

Curing agents for applications of the above materials to concrete and porous substances have required a curing mechanism other than photoinitiated free radical polymerization Free radical photoinitiators have had to employ conventional free radical chemistry (conventional thermal curing) or cationic curing of epoxide resin blends. The rationale for this is that, as material is diffused into the pores, capillaries, and micropores of porous structures, the polymer blend becomes shielded from the UV light. Additionally, in order to ensure adequate adhesion of the coating to the substrate, a transition layer had to be created, making dural cure mechanisms absolutely necessary. In order to provide the liquid material necessary for the formation of the transition layer, the mineral filler blend had to be composed of minerals that were classified as UV blockers. In most cases UV transmitters were also necessary to eliminate substrate surface appearance. Further, since the process to form the transition layer was time-dependent or diffusion-controlled, the desirable thermal reaction was controlled by chemistry to occur sufficiently after the photoinitiated cure to allow visible layer formation.

Literally hundreds of experiments were conducted on many pure minerals and hardened blends of polymer/filler combinations (indicated at A/F in the drawings). Using the correct combination of UV curative blends and UV source, it was possible to fully cure highly filled acrylate-based pigmented glazes that were over one-eighth inch thick. From these experiments, it was concluded that aluminum trihydrate (ATH), certain glass frits, certain silica-based sand (both as mined and ground), several transparent and highly pigmented acrylics, and other pure polymers could be considered UV transmitters. Conversely, most transition metal oxides, aluminum oxides in coatings over one or two mils thick, calcium carbonate or ground limestone in pigmented glazes over five mils thick, most fly ashes, perlite, combinations of mineral-filled and pigmented thermoplastics with a density of 1.72 g/cc, several popular colors of polymer-coated quartz crystals and mineral-filled pigmented thermoset plastic color chips with a density also of 1.72 g/cc were UV blockers. The relative concentrations of UV blockers to UV transmitters may range from 10–90 to 50–50 weight percent. The preferred relative concentration range is 20–80 to 35–65 for lighter-colored blockers for most embodiments of the invention.

To promote polymerization of UV curable resins, photoinitiators are typically added to the binder/filler mix. For optimum performance the absorption spectra of the photoinitiator or photoinitiator blend should be matched with the wavelength of the UV source with strong considerations to the absorption characteristics of the binder/filler mix. The ultraviolet spectrum is characterized by wavelengths ranging from approximately 450 anometers to approximately 200 nanometers. In other words, the top boundary defines the beginning of the visible light spectrum while 200 nanometer radiation is very close to the lowest energy or longest wavelength X-rays. A photoinitiator must be selected based on the system to be cured and the radiation source. Highly filled or pigmented or thick glazes compete for high energy (shorter wavelength) UV radiation required by the photoinitiator to activate the free radical curing mechanism. Lambert-Beers Law predicts the absorption of UV radiation, and the exponential factors decreasing incident light intensity are cladding thickness, molar extinction coefficient of the photoinitiator, and the concentration of UV-absorbing materials. Consequently in thick, pigmented, and filled glazes, it is necessary to employ UV wavelengths that are not substantially absorbed by pigments or fillers and have low molar extinction coefficients. A good balance between through-cure and surface-cure calls for a blend of photoinitiators and the use of an ultraviolet radiation source to supply long wavelengths that fall outside those absorbed by the pigments and fillers. The photoinitiator blend normally contains compounds that are highly reactive with short wavelength ultraviolet light (200 to 325 nanometers), which normally are considered excellent surface-curing agents, and the longer wavelengths (325 to 450 nanometers) to provide through cure. "D" and "H" UV bulbs produce short wavelength radiation.

Generally, when trying to cure thick pigmented binder/filler mixes, pigments, fillers and pigmented filler solid particles compete for and absorb shorter wavelengths of UV light, thereby reducing the effectiveness of many photoinitiators to produce free radicals necessary for polymerization. Thus, polymerization of the resin binder is typically limited to shallow depths of the surface layer. In this case it is beneficial to employ materials that require longer wavelengths in the range of 325 to 450 nanometers. BASF's Lucirin TPO, a mono acyl phosphine oxide (MAPO) photoinitiator, gives excellent through-cure in thick pigmented claddings. Ciba Geigy's Igacure 819, a bis acyl phosphine oxide (BAPO), also provides the same result. Generally a blend of photoinitiators is required for thick-section pigmented claddings. MAPO or BAPO provide a lower energy, longer wavelength through-cure, while photoinitiators, such as polymeric alpha hydroxy phenyl ketone (Sartomer's KIP 150), trimethyl benzophenone and benzophenone provide excellent surface-cure using high energy or shorter wavelength UV light activation of free radicals. Excellent surface and through-cure can be achieved using Lamberti U.S.A's KTO46, which contains a blend of three separate photoinitiators, including mono acyl phosphine oxide (MAPO), trimethyl benzophenone, and polymeric alpha hydroxy phenyl ketone.

Thermal curing, either as the sole curing mechanism or as a secondary cure subsequent to a UV initiated cure, is a necessary component in practicing the present invention. There are literally hundreds of compounds that may be used with acrylate or methacrylate chemistry. Epoxy acrylates are easily UV cured and can be thermally cured with amines. Urethane acrylates can be cured with peroxides; however, the reactions may be very fast. Thus, the relationship between types of peroxides and promoters and their concentrations are important considerations. Methacrylates are slower reacting and more easily peroxide-cured using proper process controls. Room temperature cures may be obtained with methyl ethyl ketone (MEK) peroxide promoted with cobalt napthanate or benzoiyl peroxide plus a suitable tertiary amine. There are many elevated temperature peroxides and some other compounds that are thermally activated at temperatures above room temperature. These include, in order of decreasing temperature requirement: Di-t-Butyl Peroxide, Di-t-Amyl Peroxide, Dicumyl Peroxide, Ethyl 3,3-Di (t-Butylperoxy) Butyrate, Ethyl 3,3-Di (t-Amylperoxy) Butyrate, t-Butylperoxy-Acetate, t-Amylperoxy-Acetate, 1,1-Di-(t-Butylperoxy) Cyclohexane, 1,1-Di-(t-Amylperoxy) Cyclohexane, t-Butylperoxy-2-Ethylhexanoate, t-Amylperoxy-2-Ethylhexanoate and 2,2' Azobis (Methylbutyronitrile). Other excellent thermal cure initiators include Luperox TBEC, a tert butyl 1, (2 ethyl hexyl) mono peroxy carbonate from Autofina, a Sartomer Corporation division, and various benzoiyl peroxides promoted with selected tertiary amines. The fifteen-minute half-life temperatures range from 162 C. to 50 C. In epoxide systems containing cycloaliphatic epoxides, onium salts provide an excellent secondary curing mechanism at ambient temperatures. These cures are accelerated at higher temperatures. It is possible to accelerate thermal curing with the heat generated by the UV curing source.

There are two distinct types of composite substrate materials, indicated at B in the drawings. In the first type, the substrate material is formed from an inorganic and/or organically-based liquid, slurry, or paste, having a higher density than the polymerizable resin binder/filler solution. The substrate material is pored or otherwise deposited into a mold directly onto the first polymerizable solution surface layer A (which has already begun curing), at which point the polymerizable resin binder in transition layer A/F' begins to migrate into the substrate liquid/slurry/paste, forming pockets or locks of the polymerizable resin binder, wherein at least some of the pockets are linked with the polymerizable resin binder in surface layer A/F. The resultant three-dimensional structure provides excellent bonding between the organic surface and the inorganic concrete backing. Additionally, these steps used in forming the composite are compatible with the sequence of steps required by commercially available equipment used for producing multimillions of cement-based parts yearly in automated press equipment. The existing automated equipment can be adapted to practice the present invention.

The second substrate material type is a pre-manufactured substrate, such as cast concrete block, brick or paver. Mechanical affixation of a filled polymeric surfacing resin to a solid substrate material is highly dependent on diffusion and capillary action. It is therefore beneficial that the substrate be porous so as to accommodate the creation of mechanical locks. There are also minor additives, e.g., A.R. fibers, known to the skilled artisan and are not particularly limited, that can be introduced to the dry cast concrete process that further facilitate excellent bond formation between the resin binder and a cast substrate. The most desired outcome is that the polymerizable resin binder is UV curable and chemically bonds well to the solid substrate material without the need for bond-enhancing additives. Many concrete substrate material densities and surface textures can be cladded using the present invention.

It has been found that mineral-based fillers and mineral mixtures react very well with numerous polymerizable resin binders. After mixing and segregation, these fillers and filler mixtures, when incorporated into the resin binder mixture in the range from 20 to 78 weight percent, yield two layers A/F and A/F'. For example, mixtures containing one or a combination of aluminum trihydrate, clean ground silica, glass frit, transparent colored acrylic chips, calcium carbonate in small concentrations, or aluminum oxide can be used with pigmented polymer-coated quartz, opaque-colored chips, or highly pigmented and filled thermoset or thermoplastic chips can be used as filler particles F. Filler mixtures made from these types of materials when added to freshly mixed reactive liquid thermoset resin components produce an initially homogeneous-filled prepolymer that segregates or can be segregated into a rich filler/resin binder mixture in layer A/F and a lean filler/resin binder mixture in layer A/F'. The cosmetically appealing filled cosmetic surface layer A/F may represent approximately three-quarters of the overall thickness, with one-quarter being the layer AF'. For a textured surface (e.g., slate) to be replicated closely, micron-sized particles of either fine-ground silica, fly ash, aluminum oxide, aluminum trihydrate, fines from natural quarried or modified natural minerals, or combinations of these minerals must be used. The highly filled layer A/F resulting from either a segregation phenomenon or produced through other means has several important functions. It must provide the properties important for a particular application. For example, with floor tiles these properties include wear resistance, UV stability, stain resistance, impact resistance, delamination resistance under freeze/thaw conditions, appearance and many others.

The composite is not particularly limited to a single layer A/F, but may have multiple such highly filled A/F layers, with layer A/F' being the only layer which results from a segregation effect, and the others result from various other means of deposition. These other layers A/F can act to provide several important functions, such as decorative, cost-reducing or specialty affects.

Processes according to embodiments of the invention are illustrated by the following examples:

EXAMPLE I

1. Meter, mix and dispense into a quartz-bottomed mold (see FIG. 4) a mixture of a commercially available minerals blend comprised of highly pigmented and filled polymer chips plus aluminum trihydrate (ATH). This filler blend is commercially known as a granite mix and is available from Arizona Cultured Stone International under the trademark Durastone. The polymer chip mix is highly UV blocking or absorbent, while ATH is highly UV transparent. Add a resin binder, such as a polyester acrylate oligomer, an epoxy acrylate oligomer, a urethane acrylate oligomer, or other suitable multicomponent thermoset liquids which may be blends of the above or blends of the above with reactive monomers and other additives for specific purposes. The relative concentrations of filler to binder is 20–78 weight percent filler to 80–22 weight percent resin binder. Add to the resin/filler mixture a weight percent of KTO46, a photoinitiator blend (indicated above), equal to approximately the total weight of resin or resin blend times a factor of 0.01 to 0.03 and a weight percent of a thermal cure activating peroxide equal to approximately the total resin weight times a factor of 0.015 to 1.5. The resin binder/filler mixture may fill the mold to, for example, a depth of 10 to 100 mils. Support the mold with edge guides and locate a UV lamp(s) under the edge guides in a position to direct UV radiation upwardly through the mold bottom.

2. Optionally vibrate the mold to promote creation of a top, lightly filled liquid layer (transition layer A/F') overlying a more highly filled layer A/F containing most of the decorative filler particles, which are typically UV blockers. While vitrified quartz is the recommended mold bottom material for its high UV transparency, acrylic sheet, glass, and other transparent materials will be sufficient at some cost to efficiency for low numbers of exposures.

3. Position a solid substrate into the resin rich transition layer A/F'. The substrate may be a paver, a conventional 8×8×16 inch block, a conventional concrete brick, a conventional 8×16×2 inch concrete patio stone, an extruded mineral-based tile, a ceramic tile, or any other dry cast, extruded or conventionally cast concrete structure.

4. Expose the bottom of the mold to long wavelength UV radiation (325–450 nonometers). The bulk of the resin binder cures quickly as a function of composition, cladding thickness, filler ratio, radiation spectrum, intensity and other variables. A complete through-cure of the resin binder in layer A/F and transition layer A/F' is perfected thermally over time to securely anchor the decorative surface layer (cladding) to the porous substrate.

EXAMPLE II

1. Meter, mix and dispense into a quartz-bottomed mold a 65 weight percent of the same granite mix filler used in Example I. Add 35 weight percent of a resin blend containing, for example, 68 weight percent polyester diacrylate oligomer diluted with styrene as a reactive diluent, 29 weight percent of a reactive monomer diluent, such as beta-carboxyethyl acrylate, 2 weight percent of a blend of a photoinitiator, such as mono acyl phosphine oxide (MAPO) or bis acyl phosphine oxide (BAPO), and 1% of a suitable thermal curing agent which may be a blend of 0.75 weight percent methyl ethyl ketone peroxide and 0.25 weight percent 6% solution of cobalt napthenate. The resin binder/filler mixture fills a quartz-bottomed mold to a depth of 10 to 100 mils, for example. The mold is supported and a UV lamp(s) is positioned in the same manner as Example I.

2. Position a cast CMU (concrete masonry unit) substrate in the mold with a face surface of the substrate completely covered by the resin binder/filler layer in the mold. The resin binder is now slowly polymerizing due to the thermal curing additives. However, the larger decorative filler particles continue settling toward the mold bottom, making a lightly filled (resin-rich) liquid available to diffuse into the pores and pockets at the substrate surface, thereby creating a transition layer.

3. Turn on the UV lamp(s) to expose the resin binder/filler mixture to ultraviolet radiation projected upwardly through the mold. The bulk of resin binder cures quickly. However, a significant amount of the resin binder in the substrate pores and below (in layer A/F) is obscured by the UV blocking particles in the filler and thus not cured by UV radiation continues to diffuse into the block pores, mainly by capillary action. However, the non-UV cured resin binder gradually undergoes a thermal cure. The resin binder is, however, sufficiently cured within seconds after UV radiation so that the composite can be handled. The thermal cure progresses to a complete resin binder cure over a duration, depending on the level of resin promotion, catalyst level, and curing temperature.

EXAMPLE III

1. Meter, mix and trowel onto a quartz-bottomed mold a 70 weight percent of the same granite mix filler particle blend used in Examples I and II. Add 30 weight percent of a resin blend containing 70 weight percent bisphenol A based epoxy diacrylate oligomer diluted with 1,6 hexanediol diacrylate as a reactive monomer, 2.1 weight percent of a photoinitiator blend, KTO46, 26.5 weight percent of a cycloaliphatic epoxy diacrylate and 1.4 weight percent of Sartomer's SarCat 185, a Triaryl Sulfonium Hexaflurophosphate salt dissolved in 50% Propylene Carbonate. This epoxy material is capable of being both UV and cationically cured. The dual curing mechanism in this case is different from the previous examples in that the material does not have a pot life until after exposure of UV light when both mechanisms are activated. The mixed materials will fill the transparent mold to a depth of 10 to 100 mils. In another vessel mix 29 weight percent bisphenol A based epoxy acrylate oligomer diluted with 1,6 hexanediol diacrylate monomer, a reactive diluent, 1.0 weight percent of the photoinitiator blend KTO46, 67 weight percent of a cycloaliphatic epoxy diacrylate and 3 weight percent SarCat 185. Using a draw down bar, apply this mixture to a face surface of an autoclaved aerated concrete (AAC) substrate to a depth of approximately 5.0 mils above the highest asperities of the substrate face surface. Support the mold with edge guides and locate the UV lamp(s) under the edge guides, thereby causing the UV radiation to be directed upward and through the UV transmitting mold bottom.

2. Position the AAC substrate so that the treated face surface is completely covered with the resin binder/filler prepared as above and previously deposited in the mold. At this point the very low viscosity material applied directly to the ACC substrate surface is rapidly diffusing into the substrate's pores and pockets and the larger decorative filler particles are very slowly segregating downward toward the UV transmitting mold bottom surface. There is no appreciable polymerization occurring at this point as was true in Example I.

3. Expose the bottom of the mold to ultraviolet radiation. The bulk of the material cures quickly as a function of composition, coating thickness, fill level, radiation spectrum, intensity, and other variables. However a significant amount of the low viscosity resin previously directly applied to the substrate face surface plus a smaller amount of UV-uncured resin located directly behind the UV blockers continues to diffuse into the block, mainly by capillary action. Two curing mechanisms are enabled by exposure to UV light. The first is the normal free radical mechanism of UV curing, which is extremely fast in reacting at acrylate sites and operative until the catalyst is depleted or the UV source is stopped. The second mechanism initiated by the UV source is a cationic curing mechanism which continues reacting with the epoxide rings after the UV radiation is stopped. This cationic cure will proceed at room temperature until complete polymerization takes place. This curing mechanism is commonly called a "dark" cure for this reason.

Further experimentation with the two-step resin binder application process of Example III showed that applying certain oligomer and monomer compositions to an ACC substrate can significantly improve its physical properties, particularly its modulus of rupture (MOR) strength. Experiments were conducted using various combinations of the following resins: Sartomer Corp. CN 966, a highly ductile, long-chain aliphatic urethane diacrylate oligomer; CN 964, a shorter chain aliphatic urethane diacrylate oligomer; CN 985B88 is an aliphatic urethane oligomer diluted with 12 weight percent of 1,6 hexanediol diacrylate as a reactive monomer; and SR 9003, a proproxylated neopentyl glycol diacrylate monomer. Cured CN 966 and CN 964 demonstrate elongations of 200% and 50%, respectively, and tensile strengths of 300 psi and 1000 psi respectively. Cured CN 985B88 has a 2% elongation and tensile strength over 8000 psi. CN 966, CN 964, CN 985B88, and SR 9003 are resins marketed by Sartomer Corporation.

In one experiment a resin blend of 70 weight percent SR 9003, 29 weight percent CN 966, and 1.0 weight percent photo and thermal cure initiators was applied as a transition layer to a face surface of an ACC substrate. A resin blend of 25 weight percent SR 9003, 37 weight percent CN 966, and 37 weight percent CN 964, and 1.0 weight percent photo and thermal cure initiators was mixed with an equivalent weight percent of Durastone filer and applied as cladding layer A/F to the transition layer. After a complete UV and thermal cure, the resulting composite exhibited an 18% increase in MOR strength relative to an unclad ACC block. A much more dramatic increase in MOR strength, 109%, was achieved using a transition layer resin composition of 70 weight percent SR 9003, 29% weight percent CN 985B88, and 1.0 weight percent cure initiators, and a cladding layer resin blend of 25 weight percent SR 9003, 19 weight percent CN 966, 55 weight percent CN 964, and 1.0 weight percent cure initiators mixed with an equivalent weight percent of Durastone filler.

The two-step resin binder application process described in Example III maximizes the functions provided by the transition layer and the more highly viscous cladding layer. It does so by modifying the chemical components applied to each surface so that each is able to accomplish a function not available to a single layer application. For example, the transition layer resin may be of very low viscosity so it permeates the substrate quickly and also provides a much higher mass of material to diffuse into and polymerize with the liquid modified substrate surface structure, such that, upon polymerization, superior mechanical and chemical bonds with the substrate are achieved. Also, the composition of the transition layer resin may be tailored to enhance a physical property in its polymerized state, e.g., ductility or tensile strength. The top layer A/F may be comprised in such a way as to impact cost positively, as well as enabling specific processing steps, i.e., separation on the mold surface prior to polymerization. The approach taken in Example III is to accomplish these goals with extremely compatible materials. The liquids used as a transition layer and cladding layer binders are 100% soluble in each other. This facilitates adhesion between the top layer A/F and the transition layer A/F'. The UV and thermal curing mechanisms are present in each, therefore, there is no tendency to establish unnecessary lattice strain or discontinuities. The only thing changed in the resin composition of transition and cladding layer blends may be the percentages of oligomers and reactive monomers.

Figure 4:
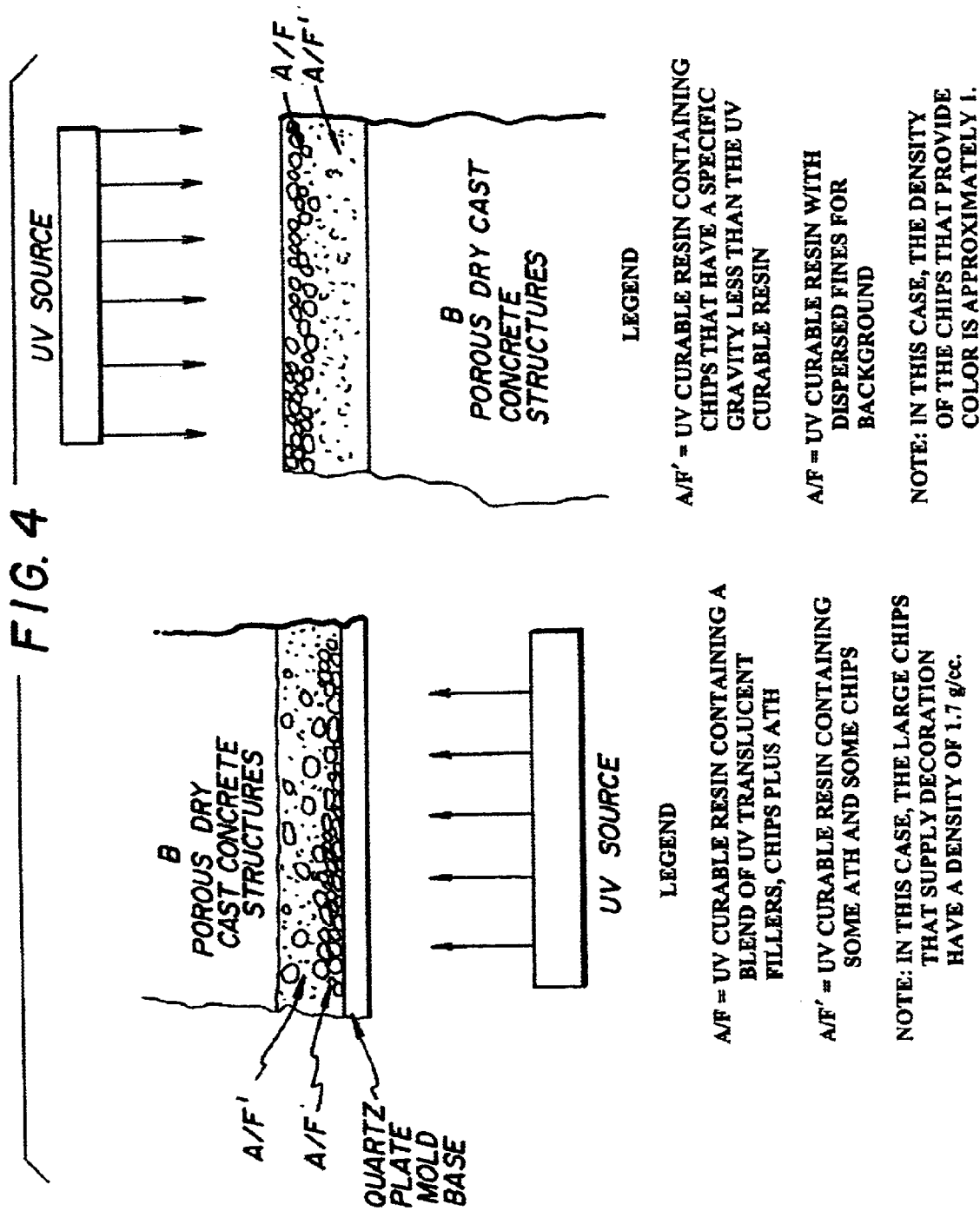
FIG. 4 consists of cut-away views of composites incorporating a polymeric binder that is curable with ultraviolet radiation.

While the above examples of embodiments of the invention use a mold to contain a resin binder/filler mixture and to accept a substrate in an upside-down orientation, it will be understood that the mixture may be applied to and cured on the top surface of a substrate without inversion, as is illustrated in FIG. 4 and exemplified in the following example:

EXAMPLE IV

1. Apply as a transition layer to the upper face of a concrete paver stone to a depth of 1–4 mils a resin blend comprising 70 weight percent SR9003 (a monomer), 29 weight percent of an oligomer (CN966 or CN964), and 1.0 weight percent of a photo and a thermal cure initiating agent. A UV transmitting filler, such as aluminum trihydrate (ATH) may be mixed into the resin blend up to 30 weight percent of the total mixture weight.

2. Pass the paver stone, such as by conveyor, under a long wavelength UV radiation emitting source to partially cure the transition layer resin blend only to a tacky state.

3. Deposit on the tacky transition layer to a depth of 10–20 mils a resin blend layer comprising 25 weight percent SR9003, 37 weight percent CN966, 37 weight percent CN964, and 1.0 weight percent photo and thermal cure initiating agents. Again, this oligomer-rich resin blend may be filled with UV transmitting solid particles, such as ATH. As a cost-saving, the oligomer concentration of the expensive CN966 resin is halved by adding an equal amount of the less expensive CN964 resin. This dual curable, oligomer-rich resin blend is a clear, rather viscous liquid.

4. Disperse over the resin layer deposited in step 3 solid filler particles, such as colored polymer-coated quartz crystals from Clifford J. Estes, ranging in size from 32 to 375 mils in their longest dimensions. These UV blocking filler particles will readily sink into and embed in the surface of the resin layer.

5. Pass the paver stone under a long wavelength UV source to cure all of the resin blend portions, especially the top surface portion of the oligomer-rich resin layer, exposed to ultraviolet radiation and thus affix the filler particles in the layer surface.

6. Allow the resin blends to thermally cure over time to complete the process of producing a paver stone having an attractive, durable, non-skid surface.

The finished product is a composite comprising an attractive functional polymeric surface cladding securely bonded to a pre-manufactured concrete substrate. The cladding can be UV stable and solid colored, granite-like or marble-like in appearance. It can also be textured and made to replicate the texture of the concrete substrate. The cladding will be impervious to water, graffiti-resistant, and can be compounded to provide special properties. The concrete substrate may be produced to control surface smoothness, bonding strength, background color, structural and physical properties.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for producing a composite having a decorative cladding as a first layer affixed to a concrete substrate as a second layer by an intervening transition layer, the method comprising the steps of:

A preparing a mixture of a polymerizable resin binder solution that is ultraviolet radiation curable and thermally curable and a solid particle filler mix as the first layer;

B depositing the first layer mixture in a mold having a UV transparent bottom;

C placing a cement-based substrate material in the mold in interfacial relation with the first layer;

D developing the transition layer consisting essentially of the binder solution at an interface of the first and second layers, such that the binder solution can migrate into the substrate material to form transition layer pockets in the substrate material; and E curing the binder solution in the first layer and the transition layer by directing ultraviolet radiation through the transparent bottom of the mold to produce a durable surface cladding mechanically and chemically affixed to the second layer.

2. The method of claim 1, further including the steps of:

F preparing the substrate material as a cement slurry that is placed in the mold over the first layer; and G thermally curing the cement slurry and binder solution.

3. The method of claim 1, wherein the substrate material is a cast concrete unit that is placed in the mold over the first layer.

4. The method of claim 3, wherein step A includes blending the solid particle filler mix to include UV radiation blocking and UV radiation transmitting solid particles.

5. The method of claim 4, wherein the blending step includes proportioning concentrations of UV blocking and UV transmitting solid particles in ranges of from 10–90 to 50—50 weight percent of the filler mix.

6. The method of claim 5, wherein step A further includes adding at least one initiator to promote UV curing of the binder solution.

7. The method of claim 5, wherein step A further includes adding initiators to promote UV and thermal curing of the binder solution.

8. The method of claim 4, wherein step A includes formulating a blend of resins in the binder solution to include at least one olygomer and at least one monomer as a low viscosity diluent.

9. The method of claim 4, wherein step A prepares the resin binder solution using at least one resin selected from the group including polyurethanes, polyepoxides, unsaturated polyesters polyols, acrylics, epoxy acrylates, urethane acrylates, polyester acrylates, acrylic acrylates, methacrylates, and monomers and oligomers based on backbone structures thereof.

10. A method for producing a composite having a decorative cladding as a first layer affixed to a porous substrate as a second layer by an intervening transition layer, the method comprising the steps of:

A preparing the first layer as a mixture of a polymerizable resin binder solution, a solid particle filler mix including 10–50 weight percent ultraviolet radiation-blocking solid particles and 90–50 weight percent ultraviolet radiation-transmitting solid particles, an ultraviolet radiation cure promoting agent, and a thermal cure promoting agent;

B applying the first layer to a face surface of the substrate, such that a resin-rich portion of the binder solution can migrate into pockets and pores in the substrate face surface to develop the transition layer; and C directing ultraviolet radiation at the mixture, thereby achieving an abrupt cure of that portion of the resin binder solution exposed to the ultraviolet radiation and leaving uncured resin binder solution to cure thermally over time as promoted by the thermal cure promoting agent.

11. The method of claim 10, wherein the mixture prepared in step A is a first mixture including a high viscosity resin binder solution, the method further including the steps of:

D preparing a second mixture of a low viscosity resin binder solution and thermal and ultraviolet radiation cure promoting agents; and E prior to applying the prepared first mixture in step B, applying the prepared second mixture directly to the face surface of the substrate, such that the low viscosity resin binder solution can readily infiltrate the pores and pockets in the substrate face surface in advance of the resin-rich portion of the high viscosity resin binder solution, thereby enhancing development of the transition layer.

12. The method of claim 11, wherein the mixture prepared in step A is a first mixture including an oligomer-rich resin binder solution, the method further including the steps of:

F preparing a second mixture of a monomer-rich resin binder solution and a thermal cure promoting agent; and G prior to applying the prepared first mixture, apply the prepared second mixture directly to the face surface of the substrate, such that the monomer-rich resin binder solution can readily infiltrate the pores and pockets in the substrate face surface in advance of the resin-rich portion of the oligomer-rich resin binder solution, thereby enhancing development of the transition layer.

13. The method of claim 11, wherein the ultraviolet radiation directing step C includes a step of using a source that emits long wavelength ultraviolet radiation within the range of 325–450 nanometers.

14. The method of claim 10, further including the steps of:

D depositing the mixture prepared in step A as the first layer into a mold having a UV transparent bottom; and E placing the substrate in the mold to apply the first layer to the substrate face surface, the first layer being exposed to ultraviolet radiation through the mold UV transparent bottom.

15. A method for producing a composite having a decorative cladding affixed to a face surface of a concrete substrate by an intervening transition layer, the method comprising the steps of:

A applying to the substrate face surface a first mixture of a first polymerizable resin binder solution including a lower concentration of a resin oligomer, a higher concentration of a resin monomer as a diluent, an ultraviolet radiation cure promoting agent and a thermal cure promoting agent, such that the first binder solution migrates into pockets and pores in the substrate face surface to develop the transition layer;

B depositing on the substrate face surface as the decorative cladding overlying the transition layer a second mixture of a second polymerizable resin binder solution including a higher concentration of a resin oligomer, and a lower concentration of a resin monomer, an ultraviolet radiation cure promoting agent, a thermal cure promoting agent, and a filler including decorative solid particles that essentially block transmission of ultraviolet radiation; and C exposing the first and second resin binder solutions to ultraviolet radiation, thereby achieving a cure of portions of the first and second resin binder solutions exposed to the ultraviolet radiation and leaving uncured portions of the first and second resin binder solutions to cure thermally over time, as promoted by the thermal cure promoting agents.

16. The method of claim 15, wherein deposition of the second mixture in step B is performed by first applying a layer of the second binder solution onto the transition layer, and then dispersing the solid filler particles into the second binder solution layer.

17. The method of claim 16, wherein, prior to deposition of the second resin binder solution in step B, the transition layer is exposed to ultraviolet radiation sufficient to cure the first resin binder solution to a tacky state.

* * * * *